United States Patent Office 3,336,724
Patented Aug. 22, 1967

3,336,724
AUTOMATIC MEASURING AND FILLING APPARATUS FOR PRE-DETERMINED QUANTITY OF MATERIAL
Tomiji Tarukawa, 51 Higashiyamacho, Itabashiku, Tokyo, Japan
Continuation of application Ser. No. 232,425, Oct. 23, 1962. This application July 11, 1966, Ser. No. 567,343
10 Claims. (Cl. 53—59)

This is a continuation of my earlier application, Ser. No. 232,425 filed Oct. 23, 1962, now abandoned.

The present invention relates to an automatic measuring and filling apparatus. It is an object of the invention to provide an automatic measuring and filling apparatus in which the feeding of the material into a measuring vessel adapted for measuring a predetermined quantity of the material, and the filling of the measured material into a container and the transferring of the filled material are automatically controlled and the feeding, filling and transferring are accurately performed so that the predetermined quantity of the material can be continuously dispensed with accuracy.

The present invention will be described in conjunction with several embodiments taken in connection with the accompanying drawing, in which.

Figure 1:
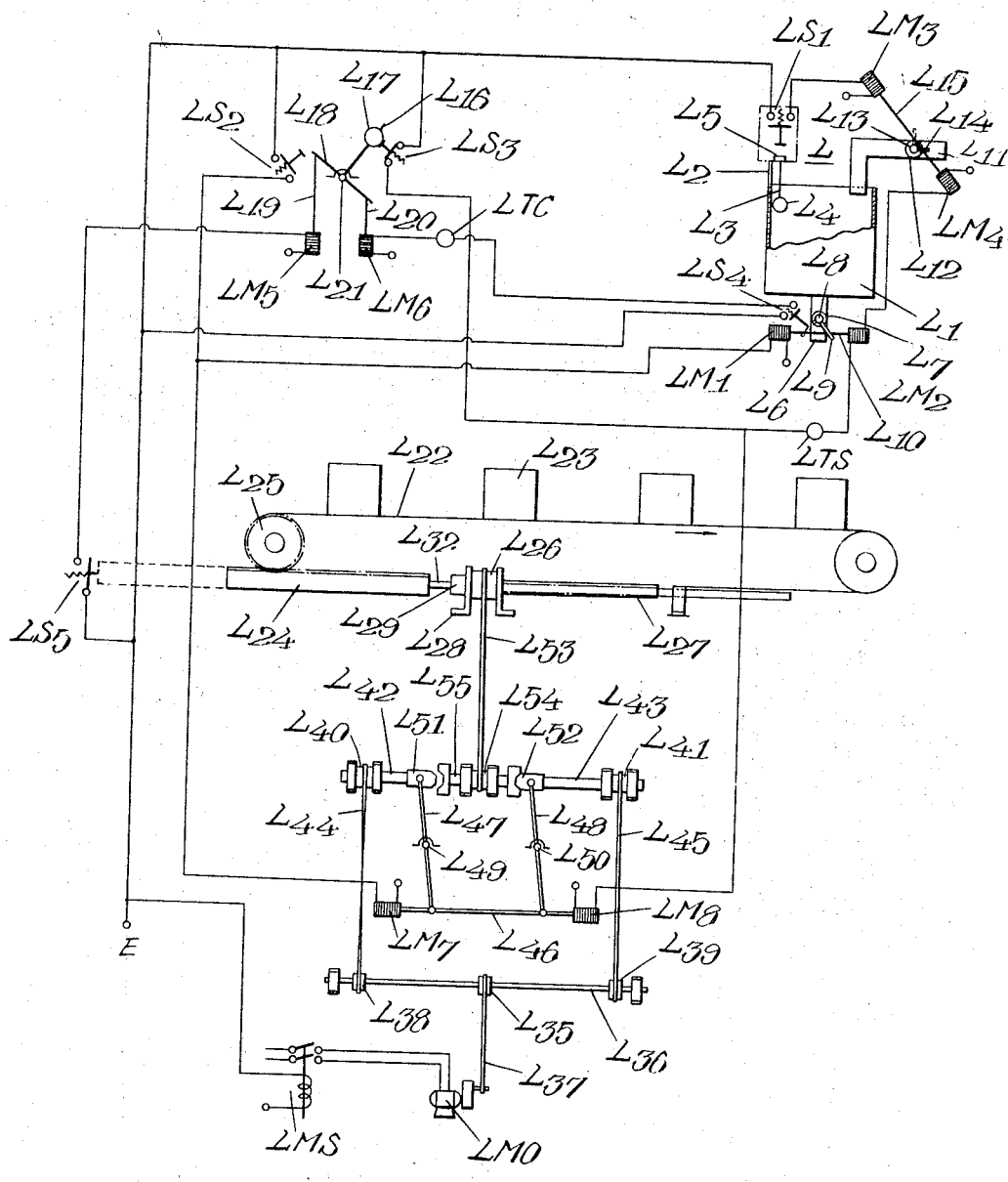
FIGURE 1 is a diagrammatic view of filling apparatus according to the present invention.

Referring now to FIG. 1, L is a material feeding device in a volume type measuring and discharging device for liquid and L1 is its measuring vessel, at the upper edge of which is provided a supporting pillar L2. A supporting rod L3 having a float L4 passes slidably through the pillar L2, a stopper L5 being connected to the upper end of the rod L3. When the float L4 is lowered, the rod is supported by the stopper. Said supporting pillar L2 is integrally provided with an operative switch LS1 actuated by the upward pressure of said float. The measuring of any predetermined quantity can be performed by displacement of the operable switch relative to the float.

A discharging port L6 attached to the bottom of said measuring vessel L1 is provided with a discharge valve L7, rod L8 of which is attached to an opening and closing lever L9. Said opening and closing lever is connected to cores of electromagnets LM1 and LM2 by means of a cable L10 and is turned by the alternate excitation of the electromagnets to open and close the discharge valve L7. In the shown state the discharge valve L7 is in the closed position.

L11 is a tube of a liquid feeding device, in which is arranged a feed valve L12 of the same type as discharge valve L7. An opening and closing lever L13 is attached to its valve rod L14. Said rod L14 is connected to cores of electromagnets LM3 and LM4 by means of a cable L15.

L16 represents one rod having a weight L17 in a switch change-over device and another rod L18 is connected at both ends to cores of electromagnets LM5 and LM6 by cables L19 and L20. L21 is a rotary shaft in said switch change-over device and LS2 and LS3 are actuating switches which are located at rocking stop positions of the weight L17 and are closed only when pressed by said weight.

A switch LS4 is arranged proximate the discharge valve L7 so that it is closed when rod L9 turns to open the discharge valve L7. A time control switch LTC actuated by the closing of switch LS4 is in a circuit interposed between the electromagnet LM6 in said change-over device and said switch LS4. The time control switch operates after a given time period so that when material in the measuring vessel L1 is completely discharged the switch actuates to energize the electromagnet LM6 and change-over the change-over device. As a consequence of which the discharge port of the measuring vessel will be closed, the feed valve L12 will be opened and the filling container L23 will be advanced by a transferring device as will be explained more fully hereinafter.

Figure 2:
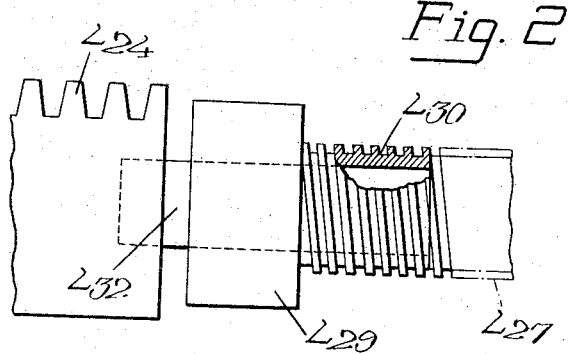
FIGURES 2 and 3 are a side elevational and a cross-section view respectively of a free wheel of the apparatus of FIG. 1.
Figure 3:
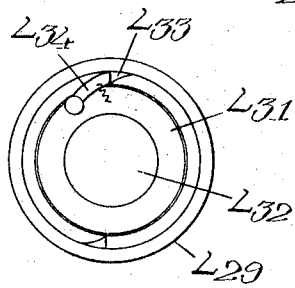

L22 is an endless belt in a transferring device which is disposed just beneath the measuring and discharging device L and intermittently transfers containers L23 on the belt in the direction shown by the arrow. Said endless belt can be moved only when a rack L24 engaging with a driving gear L25 is moved to the left in FIG. 1 and is adapted to stop when the rack is moved to the left in FIG. 1 and is adapted to stop when the rack is moved to the right. The reciprocating of the rack L24 may be effected by a change gear L26 to be rotated reversibly, said gear L26 being threadably engaged with a feed screw L27 integrally connected to the rack. The change gear L26 engages with the feed screw L27 and is held between two fixed plates L28 so as to rotate reversibly in a fixed position. At the left end of said feed screw L27 there is a fly wheel L29 which is provided at one end with same thread portion L30 as that of the feed screw L27 as shown in FIG. 2 and is loosely fitted on an annular member L31 fitted on an integral shaft L32 with the feed screw L27. As shown in FIG. 3 the inner wall of the fly wheel L29 is formed with engaging protrusions L33 in diametrically opposite positions, which engage with a pawl L34 mounted on said annular member L31 only when it is rotated in one direction and is idle on the annular member L31 when it is rotated in the opposite direction. The thread portion of said feed screw L27 will coincide with the thread portion of the fly wheel L29 only when said protrusions L33 engage with the pawl L34. The rack L24 can, of course, be moved leftwards or rightwards by opposite rotations of the change gear L26 when it engages with the feed screw, but a switch LS5 is arranged in such position that it is closed by the thrust of said rack when the same reaches the extreme position of its leftward movement. By the closing of said switch LS5, the rack L24 will be returned to the original position and at the same time the discharge port of said measuring vessel L1 will be opened. Namely, said rack can be returned upon reaching the extreme position as mentioned above, but it is necessary that upon reaching the extreme position of the rightward movement the rack is maintained at rest for some time at this position. The fly wheel L29 is arranged at the left end of the feed screw not to transmit the rotation of the change gear L26 to the feed screw after the same reaches the extreme position of the rightward movement because the gear rotates continuously. Namely, when the rack L24 reaches the end point of the rightward movement, the change gear L26 engages with the thread portion L30 of the fly wheel L29. At this time, the fly wheel idles on the annular member L31 because the pawl L34 engages with neither of the engaging protrusions L33, and thus the rack L24 remains at rest in spite of continuous rotation of the change gear L26. But when the gear L26 is reversely rotated, the rack is moved in the opposite direction because the fly wheel L29 is engaged with the annular member L31 by operation of the pawl L34. An electric motor LMO used in an endless belt driving device always rotates only in one direction if an electromagnetic switch LMS is energized, therefore the reverse rotation of the motor can be obtained by the changing-over of a clutch and different belting of a drive belt.

The clutch changing-over device is so formed that a pulley L35 on a rotary shaft L36 is driven through a belt L37 by the motor LMO and pulleys L38 and L39 on said rotary shaft and pulleys L40 and L41 on driven shafts L42 and L43 are belted by belts L44 and L45 respectively, the belt L44 being crossed to give opposite directions of rotation to the driven shafts L42 and L43 from the shaft L36. A clutch actuating rod L46 is connected at both ends to electromagnets LM7 and LM8 and may be moved axially and slidably by alternative excitation of the electromagnets. One of the ends of connecting rods L47 and L48 pivoted on shafts L49 and L50 respectively are connected to the clutch actuating rod L46 respectively and the other ends hold clutches L51 and L52 so as to slidably move them on the driven shafts L42 and L43. When the clutch actuating rod L46 is axially moved by the exciting of any one of the electromagnets LM7 and LM8, one clutch is engaged and thus the driven shaft may be rotated by the belt at that side. The condition illustrated in FIG. 1 shows the driven shaft L43 rotated through the belt L45 by the motor LMO. The reciprocating movement of said feed screw L27 is provided by a chain L53 disposed between the change gear L26 engaging the feed screw L27 and a change gear L54 mounted on a rotary shaft L55 which is rotated by the engaging of a clutch.

LTS indicates a time control switch which controls energizing time periods of the electromagnets LM1 and LM2 which are deenergized after the excitation of said magnets for a required time period.

Now, the operation of this apparatus will be explained.

In FIG. 1 is shown a state in which material is fed into the vessel L1 in the measuring and discharging device L, wherein the weight L17 of the switch change-over device is at the switch LS3 side so that the following circuit is formed.

E(Power source)–LS3–LTS–LM2–LM4

The electromagnets LM2 and LM4 are simultaneously energized. Thereby the opening and closing lever L9 is turned to the position shown in full lines to close the discharge valve L7, and the feed valve L12 is in open position under the action of the lever L14 which is turned to the position shown in full lines. Consequently, liquid supply for the vessel L1 is started. At the same time the following electric circuit is completed.

E–LS3–LM8

The electromagnet LM8 is energized to draw the clutch actuating rod L46 in its direction. Thereby the clutch L52 is engaged by the connecting rod L48 and the feed screw L27 is moved to the left by the change gear L54, the chain L53 and the chain gear L26, the driven shaft L43 being rotated by the belt L45. Thus the rack L24 is moved to the left to move the endless belt L22 in the direction shown by the arrow. A filled container L23 on the endless belt L22 conveyed away and an empty container L23 comes just under the discharge port. On the other hand, the level of the liquid in the vessel L1 rises gradually with the float L3 until the operable switch LS1 is contacted and closed by the supporting rod L4 so that the following circuit is completed.

E–LS1–LM3

The electromagnet LM3 is energized and the feed valve L12 is closed by the opening and closing lever L14 which is turned from the full line position to the broken line position shown in the drawing so that the feeding operation of the liquid is stopped and the predetermined quantity of the material is in the vessel L1.

When an empty container L23 on said endless belt comes just under the discharge port L6, the rack L24 contacts switch LS5 to close the same. Thus the circuit E–LS5–LM5 energizes the electromagnet LM5 to turn the weight L17 to the side of switch LS2. As a result the switch LS3 is opened, the switch LS2 is closed and the circuit E–LS2–LM1 is completed to energize the electromagnet LM1. Thereby, the lever L9 is turned from the full line position to the broken line position to open the discharge valve L8 so that the predetermined quantity of the liquid in the vessel L1 is discharged into the container L23 positioned just under the discharge port L6. At this time, switch LS4 is closed by the lever L9. At the same time the circuit E–LS2–LM7 is completed to energize the electromagnet LM7 so that the actuating rod L46 is pulled theretowards. Therefore, the clutch L51 is engaged by the connecting rod L47, while the clutch L52 is disengaged by the connecting rod L48. The driven shaft L42 which is rotated in an opposite direction to that of shaft L43 by the action of the crossed belt L44, causes the change gear L26 to be driven in reverse direction. Thus, the feed screw L26 starts to move the rack L24 rightward. Therefore, switch LS5 is opened. However, the endless belt L22 remains at rest because the gear L25 engaging with the rack and mounted on the driving shaft for the endless belt L22 only idles as mentioned above. The movement to the right of the rack L24 is continued until it returns to its initial position. In this position, the thread portion L30 of the fly wheel L29 mounted at the left end of the feed screw L27 engages with the gear L26 and thereby the fly wheel L29 is only idled so that the rack L24 stays in its position in spite of the continued operation of the motor. When the liquid in the measuring vessel L1 is completely discharged into the container L23 and the vessel L1 is emptied, the time control switch LTC operates to energize the electromagnet LM6 so that the weight L17 is turned to its initial position. As a result thereof, the switch LS2 is opened and the switch LS3 is closed. Thus, the feeding of liquid and displacement of the transferring device are repeated again.

Figure 4:
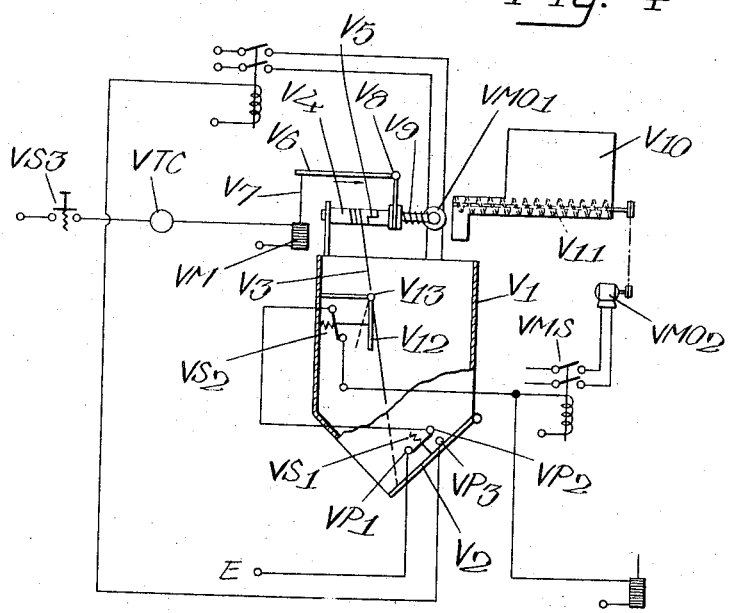
FIGURE 4 shows a volume type measuring apparatus.

FIG. 4 shows a volume type measuring and discharging device for grain material. V1 is a measuring vessel, on the bottom of which is arranged a discharge port and which is provided with a cover V2 pivoted thereon so as to be freely opened or closed. Said cover V2 is connected through a cable V3 to a wind up shaft V4 which is connected by a clutch V5 to a rotary shaft of a motor VMO1 mounted on the top of the measuring vessel V1. V6 is an L-shaped lever, one arm of which holds the clutch V5 and the other arm of which is connected through a cable V7 to a core of an electromagnet VM for turning said L-shaped lever V6. When the electromagnet VM is energized, the cable V7 is pulled therein and the L-shaped lever V6 is pivoted about a shaft V8 to move the clutch V5 held by one arm in the direction shown by the arrow against a spring V9 and to thereby disengage said clutch V5. Being disengaged with the motor VMO1, said shaft V4 is unwound to open the cover V2. When said electromagnet VM is deenergized, the clutch V5 is simultaneously engaged by the pressure of said spring V9. V10 is a reservoir, in the bottom of which is arranged a screw conveyor V11 driven by a motor VMO2 through a belt. VMS is a magnetic switch and when it is energized the motor VMO2 is started. VS1 is a switch which is arranged in such position that it is controlled by the closing and opening of said cover V2. Contacts VP1 and VP2 of the switch are in a feeding circuit and are electrically connected when the cover V2 is closed. Contacts VP1 and VP3 are in a closing circuit and are electrically connected when the cover V2 is opened.

The illustrated state shows the cover closed. There is arranged an operable switch VS2 on the rear side of an adjusting plate V12 so as to be controlled by said plate V12 which is pivoted on and depends from a shaft V13 disposed at a suitable level on a side opposite to the feed port side of the vessel V1, said switch corresponding to the operable switch LS1 in the first embodiment. The switch VS2 is opened when the adjusting plate V12 is moved as shown by the broken line by the pressure of material in the measuring vessel V1 and thereby a feeding circuit is opened to stop the feeding operation of material. The illustrated state shows the adjusting plate released. In order that any suitable modification in quantity retained in vessel V1 is desired, it is only necessary to relocate said operable switch VS2 in the vessel V1. The material in the reservoir is fed into the measuring vessel V1 and increases gradually in volume and at last the pressure of the material causes rotation of the adjusting plate from the full line position to the broken line position as shown in FIG. 4. When the material in the measuring vessel V1 thereby reaches a predetermined quantity, said switch VS2 is pressed and opened by adjusting plate V12 and thereby the feeding circuit is opened, so that the motor VMO1 and the feeding operation of material is stopped. By the closing of a switch corresponding to the switch LS5 in FIG. 1 the switch change-over device is actuated and the material in vessel V1 is discharged into a container. That is to say the switch VS3 (corresponding to the switch LS2) in the change-over device is closed, a circuit to the electromagnet VM energizes the same to pull down the cable V7 so that the L-shaped lever V6 is turned about the shaft V8 to disengage the clutch V5, and therefore the cover V2 is opened by its own weight and the material to discharge the latter from the vessel V1. Since the material discharging is controlled by the time control switch VTC the electromagnet VM, after completion of the material discharging, is disengaged to engage the clutch V5. As the contacts VP1 and VP2 in said switch VS1 have been contacted by the opening of the cover V2 the motor VMO1 is started and thereby pulls up the cover V2 through the winding shaft V4 and the cable V3 by engagement of the clutch V5 to close the discharging port. By this closing the contacts VP1 and VP3 in the switch VS1 are opened, the contacts VP1 and VP2 are connected, the motor VMO1 is stopped and the closing operation of the cover V2 is terminated. At the same time, switch VS2 is released from the pressure of the adjusting plate by the discharging of the material and thereby closed so that the material feeding circuit is closed through said contacts VP1 and VP2 and the material feeding operation is effected again. At this time said switch change-over device is restored to its initial position and the filled container is transferred through the switch (corresponding to the switch LS3 in FIG. 1).

Figure 5:
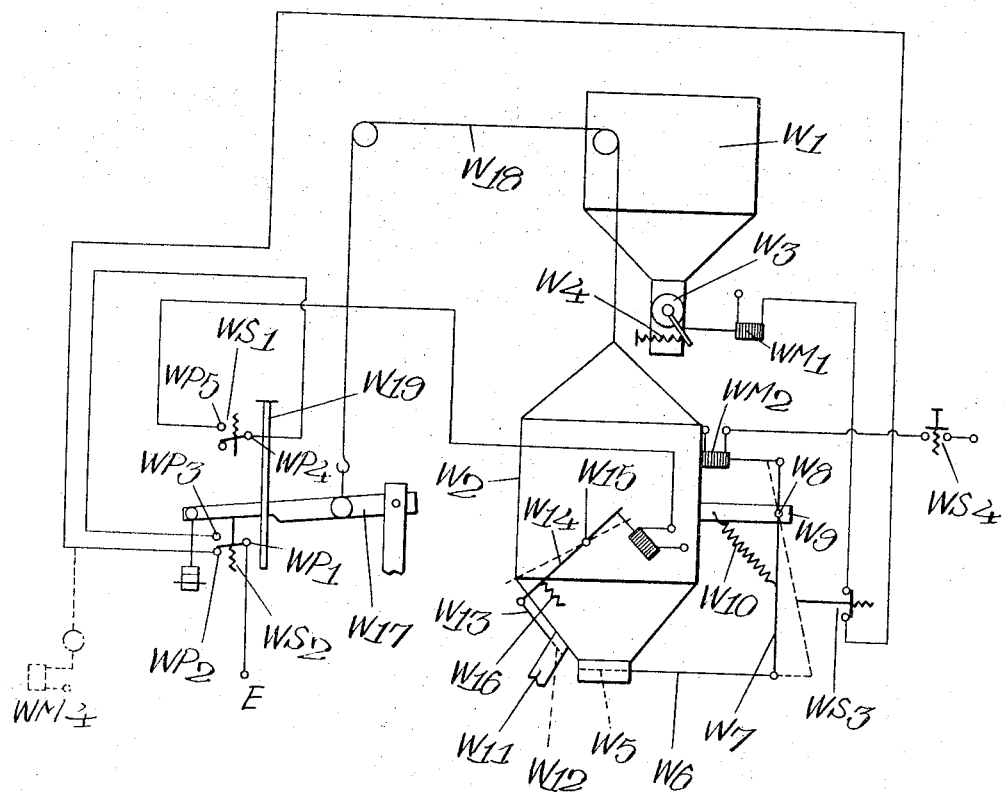
FIGURE 5 shows a weight type measuring apparatus.

The apparatus shown in FIG. 5 is adapted to fill an accurate quantity of material in weight by the discharging of excess material when it is excessively fed into a measuring vessel.

A reservoir W1 for material, mounted above a measuring vessel W2 has a valve W3 which is opened by an electromagnet WM1 against the action of a spring W4. A main discharge port mounted on the lower part of the measuring vessel W2 is provided with a cover W5 which opens and closes said port. The cover is connected by a connecting rod W6 to a lever W7 pivoted on a pivot W8 on a supporting plate W9 projecting from a side of said measuring vessel W2, said cover W5 being opened by an electromagnet WM2 connected to said lever W7 and being closed by a spring W10. The measuring vessel W2 is provided with an auxiliary discharging port for discharging excess material on its inclined surface, in which is a chute W11 with a cover W12 for opening and closing said auxiliary port. The cover W12 is connected by a connecting rod W13 to a lever W14 pivoted on a pivot W15 and is opened by an electromagnet WM3, to a core of which is attached said lever W14, and closed by a spring W16.

The measuring vessel W2 is connected to a balance beam W17 through a cable W18. A staff W19 for the balance beam is provided with a switch WS1 at its upper portion and a switch WS2 at its lower portion and between which an end portion of the balance beam W17 is placed. A switch WS3 is arranged at such a position as to be controlled by the turning of lever W7 and in turn controls electromagnet WM1.

The illustrated state is that in which material is being fed into the measuring vessel W2, by reason of the closing of circuit E–WS1 (WP1–WP2)–WS3–WM1, the electromagnet WM1 being energized to open a valve W3 so that material in the reservoir W1 is fed into the measuring vessel W2. The end portion of the balance beam rises as the material in the measuring vessel W2 increases gradually in weight and thereby the contacts WP1 and WP2 in the switch WS2 are opened so that the feeding operation is stopped and the contacts WP1 and WP3 are connected. In this case the end portion of the balance beam further rises to contact switch WS1 and to connect the contacts WP4 and WP5 so that the electromagnet WM3 is energized because of the introduction of excess material into vessel W2. Because of the connection of contacts WP4 and WP5 the lever W14 is turned to the position shown by the broken line about the pivot W15 to open the cover W12 of the auxiliary discharge port so that the excess material is discharged out of vessel through the chute W11. Then balance beam W17 is lowered and achieves a horizontal position, when material in the vessel reaches the predetermined quantity, to release the switch WS1 and open the contacts WP4 and WP5 and to deenergize the electromagnet WM3 so that the lever W14 is turned to the full line position by the spring W16 to close the cover W12. The discharging operation of the excess material is thereby stopped. Now a switch (corresponding to the switch LS2 in FIG. 1) is closed, to operate the electromagnet WM2 so that the main discharging port is opened through the lever W7 to dispense the measured material into a container. Upon the completion of this operation, electromagnet WM2 is deenergized by a circuit (including an electromagnet WM4 corresponding to the electromagnet LM6 in FIG. 1) shown by the broken line to close the main discharge port and the measurement of material is performed again.

Figure 6:
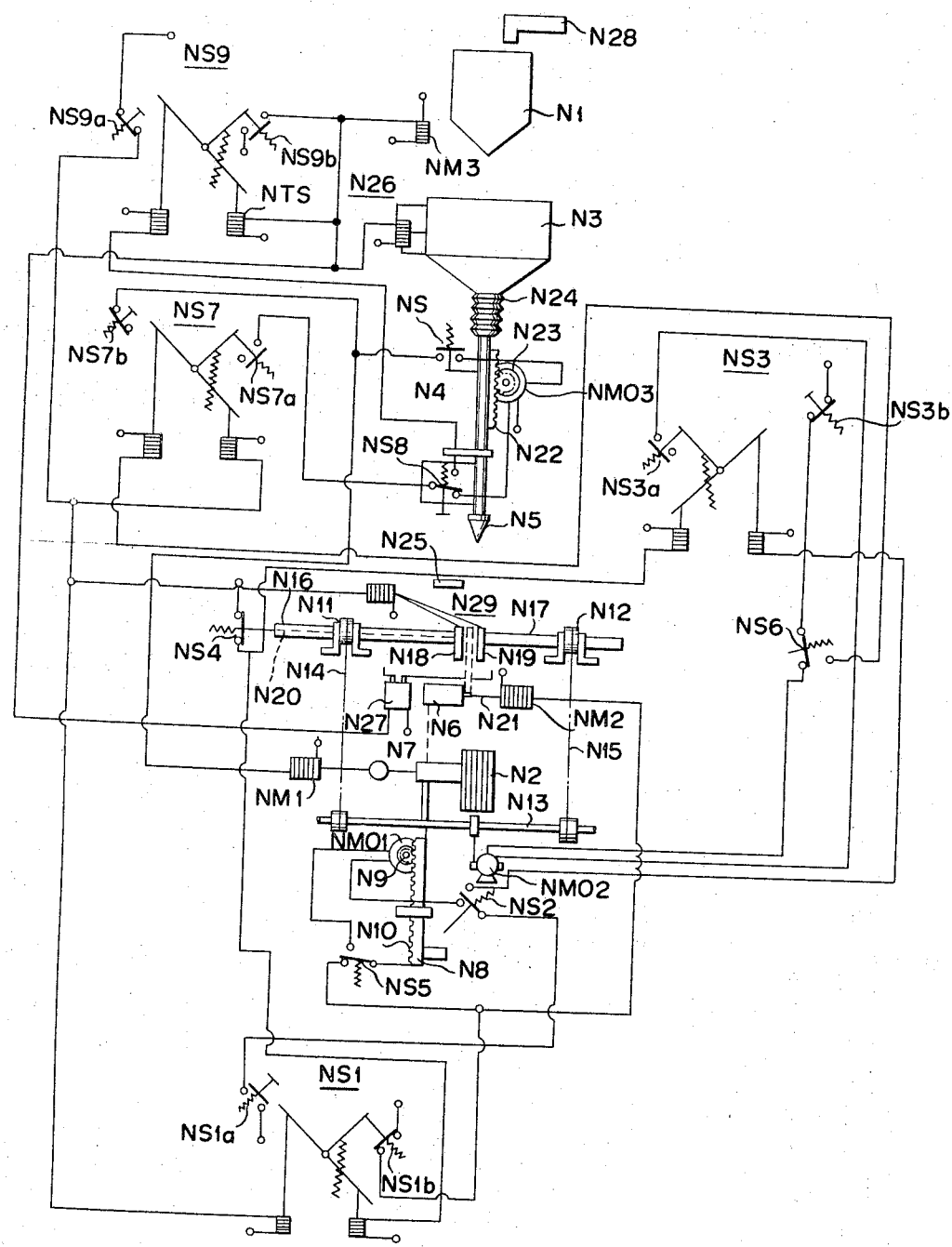
FIGURE 6 is a diagrammatic view of a further embodiment of the filling apparatus.

FIG. 6 shows an apparatus wherein measuring material stored in a measuring tank N1 is filled into a bag N2 through a hopper N3, a tube N4, and a nozzle N5 in response to the transferring of the bag to a filling position.

In FIGURE 6 there is shown a device for feeding a bag into its filling position, by a suction plate N6 by which a bag N2 at a waiting position is sucked by the displacement of plate N6 through a lever N7 when an electromagnet NM1 is energized. Since a switch NS1a of a change-over device NS1 is closed in response to the releasing of a filled bag which has already been at the filling position, a reversible motor NMO1 is rotated through a switch NS2. Therefore, the feeding device N8 is raised through a pinion N9 and a rack N10 to feed the bag N2 to the filling position. Said switch NS2 is so arranged that it is changed over when said rack advances to the filling position as shown by the broken line. The motor NMO1 is stopped by the change-over of the switch NS2, and the bag N2 is stopped at the filling position while at the same time a changing-over device NS3 is changed over by the switch NS2 to close a switch NS3a and to rotate a motor NMO2. From this rotation feed gears N11 and N12 are rotated in oppposite directions from a shaft N13 by belts N14 and N15 and belt pulleys so that feed rods N16 and N17 are displaced towards the walls of the bag N2 are the upper opening thereof. Suction plates N18 and N19 attached to said rods N16 and N17 engage the side walls of the bag. By the action of suction a rod N20 inserted in the rod N16 is actuated to push a switch NS4 and close the same. This closure causes said change-over device NS3 to return to the original state shown, opening switch NS3a and closing switch NS3b to stop the motor NMO2. Upon the closing of said switch NS4 the change-over device NS1 is restored to the original state as shown to open the switch NS1a and close the switch NS1b. Thereby an electromagnet NM2 is energized so that air is injected into said suction plate N6 by means of a release means N21 to break adhesion between plate N6 and the bag. At the same time the motor NMO1 is reversely rotated by closure of a switch NS5 and the feeding device N8 is lowered to its original position at which switch NS5 is opened to stop the motor NMO1. On the other hand, the motor NMO2 is reversely rotated through a switch NS6 by the closing of said switch NS3b and the feeding rods N16 and N17 are moved in opposite directions (shown by the arrows in the drawing) to open the bag. The feeding rod N17 contacts switch NS6 at the end of its displacement and the motor NMO2 is stopped and the opening action ceases. At the same time a change-over device NS7 is actuated to close a switch NS7a and rotate a motor NMO3 through a switch NS8 on the tube N4. Thereby the nozzle N5 of the tube N4 is inserted into the opening of the bag N2 by being driven by a rack N22 on the side of the tube N4 through the action of a pinion N23 which is driven by motor NMO3. A bellow N24 between the hopper N3 and the tube N4 is elongated as the tube descends. When the tube is lowered to a given position the switch NS8 is changed over by a stopper N25 arranged at a position corresponding to the above mentioned given position to stop the motor NMO3. A change over device NS9 is operated through the switch NS8 to open a switch NS9a and close a switch NS9b. A discharge means NM3 on the measuring tank N1 is operated so that a measured quantity of material in the tank N1 is discharged into the hopper N3 and filled into bag N2 via nozzle N5 and tube N4. Then vibrating devices N26 and N27 respectively attached to the hopper N3 and a supporting member of the bag may be so operated that the material is fed smoothly from the hopper through the tube into the bag and filled closely in the bag. After the completion of the filling a time switch NTS in the changing-over device NS9 is operated to close the switch NS9a and open the switch NS9b and thereby the filling action is stopped and the changing-over device NS7 is activated to open the switch NS7a and close switch NS7b and to reversely rotate the motor NMO3 through switch NS. Then the tube N4 is raised to open the switch NS which is arranged at a given position so that the motor NMO3 is stopped to cease the raising action. At the same time, the measuring tank N1 is fed automatically with material from a feeding device N28 and stored with a predetermined quantity of material in a manner similar to that in FIGS. 1, 4 or 5. During raising of the tube N4, i.e. upon closure of switch NS7b electromagnet NM1 is energized, and the suction plate N6 sucks the following bag. After the completion of the filling of materials, an electromagnet NM4 is energized by the closing of the switch NS9a so that a suction releasing device N29 for the suction plates N18 and N19 is actuated to inject air into said plates. Thereby the bag is released from each plate and freely falls to a feed station. Simultaneously with said action the change-over device NS1 is operated to close the switch NS1a, and the above mentioned operations are repeated again.

If a bag is opened widely, the up and down motion of the nozzle is not necessary. In this case the circuits to the electromagnet of the change-over device NS7 operated by the closing of the switch NS6 and between the electromagnet of the change-over device NS9 and the switch NS8 are eliminated and a circuit to the electromagnet of the device NS9 is added as shown by the broken line. Material is then directly discharged through the hopper into a bag.

The present invention has been explained by the illustrated constructions, but it is not limited by such constructions, and is intended to include any modifications and changes within the scope of one skilled in the art.

What is claimed is:
1. Apparatus for automatically filling bags comprising bag opening means including a pair of rods having adjoining ends, suction members on said ends, driving means for reciprocating at least one of said rods; bag feeding means for feeding a bag between said suction members; first sensing means which operates in response to the feeding of a bag between said suction members on said rods by said bag feeding means; first actuating means for actuating said driving means which moves said one rod towards the other by the action of said first sensing means so as to cause said suction members to suck and hold the opposite side walls of the bag; second actuating means for actuating said driving means to move said one rod away from the other and open the bag by said suction members; second sensing means operative in response to the opening of the bag; and material feeding means for feeding material into the opened bag by the action of said second sensing means.

2. Apparatus according to claim 1, further including means for actuating said material feeding means for feeding material into the opened bag by the movement of the rods away from each other.

3. Apparatus according to claim 1, further including guide means for guiding material from said material feeding means into the bag and means for actuating said material feeding means in response to the inserting of said guide means into the opened bag.

4. Apparatus according to claim 3, further including means for lowering said guide means into the opened bag by the relative movement of the rods away from each other, and means for raising the guiding means upon completion of the feeding of material into the bag.

5. Apparatus according to claim 1, wherein said material feeding means includes a measuring tank and means for automatically measuring and storing in said tank a predetermined quantity of material after the discharging of material into the bag.

6. Apparatus according to claim 1, wherein said driving means is coupled to both rods to reciprocally drive the same.

7. Apparatus according to claim 1, wherein said bag feeding means comprises means for engaging the first of a stack of bags by suction, means for displacing the engaging means between the rods when they are away from one another, and means for releasing the suction of the engaging means after the suction members on the rods have engaged the side walls of the bag.

8. Apparatus according to claim 7, wherein said bag feeding means comprises means for acting on said displacing means to withdraw the engaging means to its original position for engaging the next bag in the stack after the suction members on the rods have engaged the side walls of the bag.

9. Apparatus according to claim 1, comprising means for subjecting the bag and the material feeding means to vibration while the bag is being filled.

10. Apparatus according to claim 1, comprising means for releasing the suction in said suction members after the bag has been filled to enable release of the filled bag.

References Cited
UNITED STATES PATENTS

| | | | |
|---|---|---|---|
| 2,546,193 | 3/1951 | Lindstaedt et al. | 53—188 |
| 2,753,097 | 7/1956 | Kindseth et al. | 53—188 |
| 2,781,620 | 2/1957 | Hopkins et al. | |
| 3,050,918 | 8/1962 | Helm et al. | 53—188 X |

TRAVIS S. McGEHEE, *Primary Examiner.*